H. MOORE.
MOISTURE CUP.
APPLICATION FILED FEB. 14, 1920.

1,370,665. Patented Mar. 8, 1921.

UNITED STATES PATENT OFFICE.

HARLAN MOORE, OF NEW YORK, N. Y.

MOISTURE-CUP.

1,370,665.      Specification of Letters Patent.      Patented Mar. 8, 1921.

Application filed February 14, 1920. Serial No. 358,579.

*To all whom it may concern:*

Be it known that I, HARLAN MOORE, a citizen of the United States, and a resident of the city of New York, in the county of New York and State of New York, have invented certain new and useful Improvements in Moisture-Cups, and do hereby declare that the following is a full, clear, and exact description and specification thereof.

My invention relates to devices for holding water or other moistening fluids or substances; and so devised and constructed as to be conveniently, cheaply and sanitarily attached to the tube or container holding the substance to be moistened. In practical usage I have found the invention most serviceable in connection with the use of shaving cream or paste which is ordinarily inclosed in a thin, flexible, metal tube, from which the cream or paste is easily pressed out as needed.

The use of cream or paste, for shaving, requires very little moisture; but some moisture is necessary; and such moistening ordinarily necessitates the use of a large metal or china shaving-cup, if water is not immediately at hand by the mirror in front of which the shaving is done.

The public demand for shaving cream or paste is constantly increasing and has brought this article into very extensive use, being more sanitary, more convenient, less expensive, and productive of better and more satisfactory results than any form of lathering substance heretofore devised.

The object of my invention is to supply a new and useful moistening cup of convenient size, inexpensive construction and handy usage. When employed in connection with a tube containing shaving cream or paste, the invention overcomes the many difficulties and annoyances of shaving where a supply of water is not immediately at hand, necessitating an ordinary shaving-cup or else walking from the water to the mirror with the consequent drying of moisture. My device is conveniently attached to, and forms a light, compact, inexpensive, and ornamental as well as useful part of, the tube; and is therefore readily adapted to traveling and camping purposes as well as home usage; and can be thrown away with the tube after the cream or paste is entirely used up.

In connection with the tube, the moisture cup also performs the function of a sanitary and air-tight closure of the tube thereby fully protecting the cream or paste.

In the process of shaving, I have also found the invention very useful and sanitary as a means of support for the shaving brush when not in actual use in lathering. The brush can be laid flat across the open mouth of the moisture cup, when shaving, thereby keeping the bristles of the brush free from contact with the surface of the dresser or stand. If the shaving brush is flat-topped, and should be stood on end, the lather tends to run down into and weaken the joints of the bristles, and also overflow on the handle of the brush making it too slippery for convenient use. The mouth of the ordinary shaving-cup is too wide to permit of laying the brush across it; and if the brush is placed upright in the cup the lather tends to run off, and too much moisture is absorbed.

My invention may be embodied in various forms and for numerous uses; but in the accompanying drawings I illustrate the moisture cup as adapted to the ordinary tube container of shaving cream or paste, with the use of water for moistening. The device can be made in quantity, of thin metal, fiber-board, or other material; with a minimum of material, cost of stamping dies and operations, and at a very low general cost of production.

In the accompanying one sheet of drawings, similar reference numbers and characters indicate the same parts in the several figures, in which:—

Referring to Figs. 2, 3, 4, 5, 6, 7, 8, 9, 10, 11, 12, 13, 14 and 15, of the drawings, 19 is a cup-shaped top preferably cylindrical in form and made of thin metal, but any other form or suitable material having the same general characteristics may be employed if so desired.

The moisture cup 19, is open at one end and closed at the other. When in use, for shaving, the open end is up. When fitted, in reverse, on the tube, 16, the open end is down, in which position the device acts as a secure, airtight and sanitary closure to the tube; and as further security, for the foregoing purpose, the sides of the cup should preferably extend down below the ordinary oblique slant of the tube, the diameter of the cup being made slightly larger than the diameter of the tube to give a snug fit.

Figure 2:
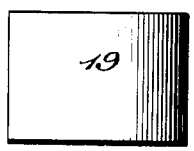
Fig. 2 is a side view of one form of the moisture cup.

In Fig. 2, the moisture cup, 19, is shown with the open end up, in position for holding water for moistening purposes.

Figure 3:
Fig. 3 is a side view of a modification of the moisture cup.

In Fig. 3, the moisture cup, 19$^a$, is the same as the moisture cup, 19, in Fig. 2, except that the periphery of the open end, instead of being a smooth edge, is provided with elongated indentations or scallops, 20, which facilitate holding of brush laid across the open end, and provides a yielding edge which insures a tight fit with the container.

Figure 1:
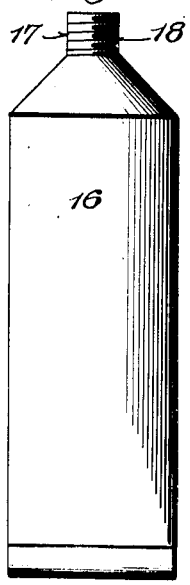
Figure 1 is a side view of an ordinary metal tube for holding shaving cream or paste, and showing the usual threaded nipple at the top but without the ordinary small screw cap piece which screws on the nipple.
Figure 4:
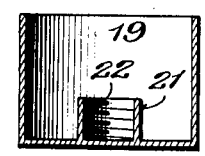
Fig. 4 is a sectional view showing the moisture cup.

In Fig. 4, the moisture cup, 19, is in sectional view showing the small interior cap, 21, which projects upwardly from the center of the inner side of the closed end of the moisture cup and provided with threads, 22, to engage in the threads, 18, of the nipple, 17, of the tube, 16, of Fig. 1.

Figure 5:
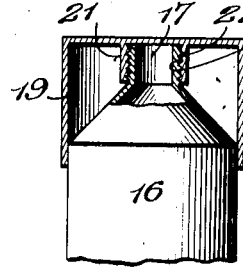
Figs. 5, 6, 7, 8, 9, 10, 11, 12, 13, 14 and 15 are sectional views of further modifications and variations of the moisture cup fitted in position on the tube.

In Fig. 5, the interior threads, 22, of the cap, 21, inside the moisture cup, 19, engage in the exterior threads, 18, of the nipple, 17, of the tube, 16.

Figure 6:
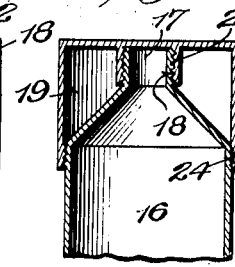

In Fig. 6, the moisture cup, 19, and inside cap, 21, are the same as in Fig. 5, except that the open end of the moisture cup is provided with interior threads, 23, which engage in a thread, 24, provided on the outside upper part of the tube, 16.

Figure 7:
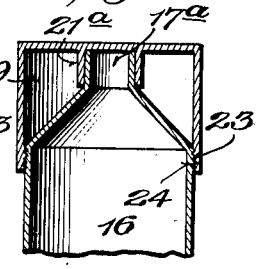

In Fig. 7, the open end of the moisture cup, 19, is provided with interior threads, 23, to engage in a thread, 24, as in Fig. 6; but the inside cap, 21$^a$, is not provided with threads and fits smoothly over a plain nipple, 17$^a$, of the tube, 16.

Figure 8:
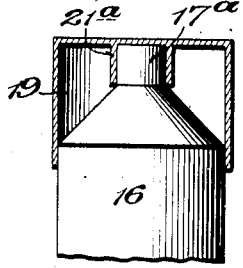

In Fig. 8, the open end of the moisture cup, 19, is not provided with threads; nor is the inside cap, 21$^a$, threaded.

Figure 9:
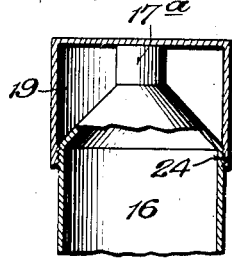

In Fig. 9, the open end of the moisture cup, 19, is provided with interior threads, 23, to engage in a thread, 24, as in Fig. 6; but the inside cap is entirely omitted and the closed end of the moisture cup presses down on the end of the nipple, 17$^a$, of the tube, 16.

Figure 10:
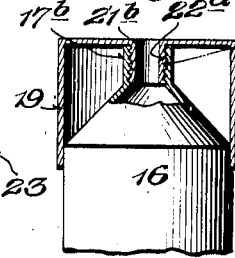

In Fig. 10, the inside cap, 21$^b$, of the moisture cup, 19, is provided with threads, 22$^a$, on its exterior, instead of interior as in Fig. 5, and engages in interior threads, 18$^a$, of the nipple, 17$^b$, of the tube, 16.

Figure 11:
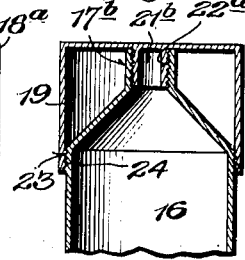

In Fig. 11, the inside cap, 21$^b$, and moisture cup, 19, are the same as in Fig. 10, except that the open end of the moisture cup is provided with interior threads, 23, which engage in a thread, 24, provided on the outside upper part of the tube, 16, as in Fig. 6.

Figure 12:
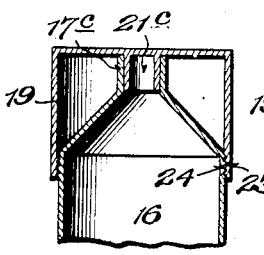

In Fig. 12, the open end of the moisture cup, 19, is provided with interior threads, 23, to engage in a thread, 24, as in Fig. 11; but the inside cap, 21$^c$, is not provided with threads and fits smoothly down in the opening of the nipple, 17$^c$, of the tube, 16.

Figure 13:
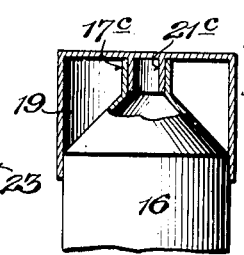

In Fig. 13, the open end of the moisture cup, 19, is not provided with threads; nor is the inside cap, 21$^c$, threaded.

Figure 14:
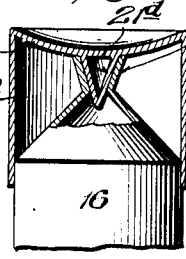

In Fig. 14, the moisture cup, 19$^b$, has its closed end, 25, concaved instead of entirely flat; and while this structure can be employed with any of the forms shown in the foregoing figures, it is preferred in connection with a plain inside cap, 21$^d$, which is preferably tapered and fits down tightly in the opening of the nipple, 17$^d$, of the tube, 16.

Figure 15:
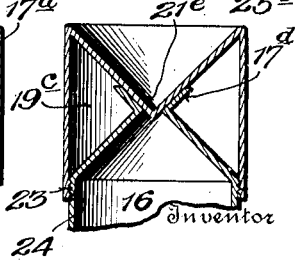

In Fig. 15, the moisture cup, 19$^c$, has its closed end, 25$^b$, deeply concaved, and elongated preferably into a tapered cap, 21$^e$, fitting down in the opening of the nipple, 17$^d$, of the tube, 16, as in Fig. 14; and the open end of the moisture cup is provided with interior threads, 23, to engage in a thread, 24, as in Fig. 11.

Many other modifications and variations will readily suggest themselves to anyone without departing from the essential and broad elements of the herein described invention; as, for example, the shape of the moisture cup may be in other forms besides cylindrical; and the small inside cap may be of many shapes, cylindrical, conical, rounded, and otherwise, and solid as well as hollow in many of the forms; and, if desired, the cup can be fastened to the tube by means of an ordinary clasp, or hinge or chain; and the interior of the cup or the inside cap may, if desired, be provided with a packing of cork, felt or similar material.

From the foregoing disclosure of the construction and operation of my invention, it will readily be seen that all the advantages and objects of the moisture cup, set out in the statement of invention and description, are fully carried out; and all the disadvantages of the present and usual forms of moistening devices, which are large, cumbersome, expensive and unsanitary, are entirely overcome by the use of my construction of cup which is small, compact, inexpensive and sanitary.

For utility in shaving, I find from practical usage that the cup may be made very shallow and yet hold more than ample water for the entire purpose. In fact, the less water, consistent with absolute need, the better; so that the shaving brush is not so moistened as to cause the lather to drip and run. I find, further, that, in using the moisture cup with tubed cream or paste, the slight moisture left in the cup after shaving, and rinsing, tends to prevent the end of the cream or paste from the hardening and clogging that frequently happens with use of the present ordinary cap, which is very small, difficult to handle, and often displaced.

What I claim is:—

1. In combination with a compressible container having a contracted portion with an outlet, a combined moisture cup and closure consisting of a rigid hollow cup-shaped element the bottom section of which is adapted to seal the outlet of said container; and the lateral inner sides of the free end of the cup so constructed as to engage the outer surface of said compressible container adjacent its contracted portion and form a chamber around said contracted portion.

2. In combination with a compressible container having a contracted portion with an outlet, a combined moisture cup and closure consisting of a rigid hollow cup-shaped element adapted to hold liquids for moistening a brush when the contents of said compressible container are in use, and the bottom section of said rigid cup-shaped element being provided with a projecting portion for sealing the outlet of said compressible container when the contents are not in use.

3. A combined moisture cup and closure, for a compressible container, adapted to be employed to seal the container and also to hold liquids for moistening purposes, consisting of a hollow cup-shaped element provided with a projecting portion for sealing the outlet of said container, and the periphery of the open end of said element being provided with scallops for the purpose set forth.

In testimony whereof I affix my signature.

HARLAN MOORE.